Oct. 16, 1928.                                                               1,688,214
L. M. WALDEN
DIRIGIBLE LIGHT FOR MOTOR VEHICLES AND THE LIKE
Filed May 29, 1925                    2 Sheets-Sheet 1
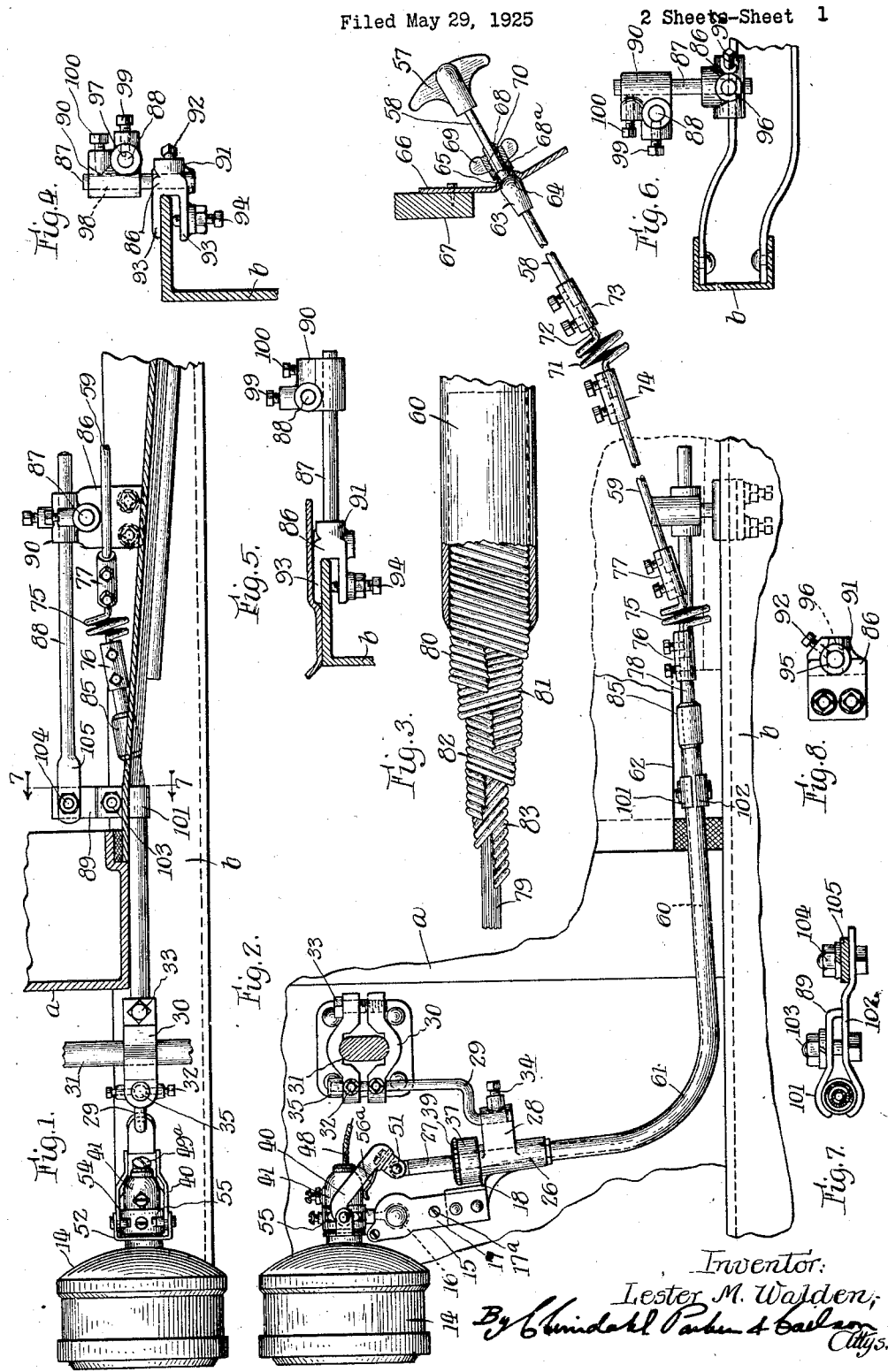
Inventor:
Lester M. Walden Oct. 16, 1928. 1,688,214
L. M. WALDEN
DIRIGIBLE LIGHT FOR MOTOR VEHICLES AND THE LIKE
Filed May 29, 1925 2 Sheets-Sheet 2
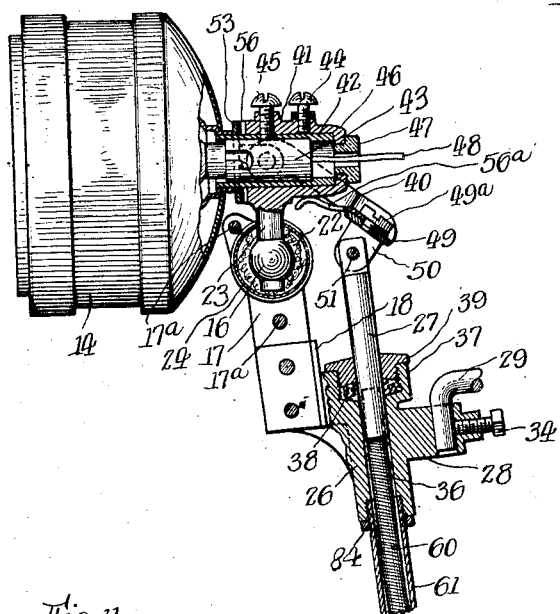
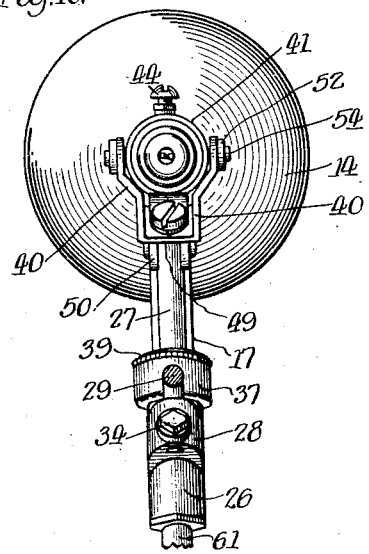
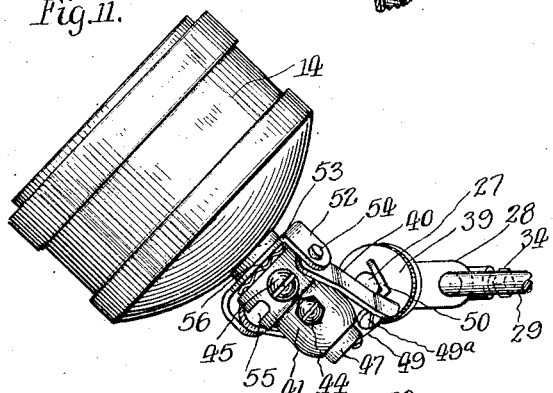
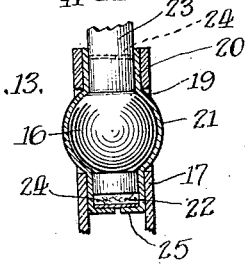
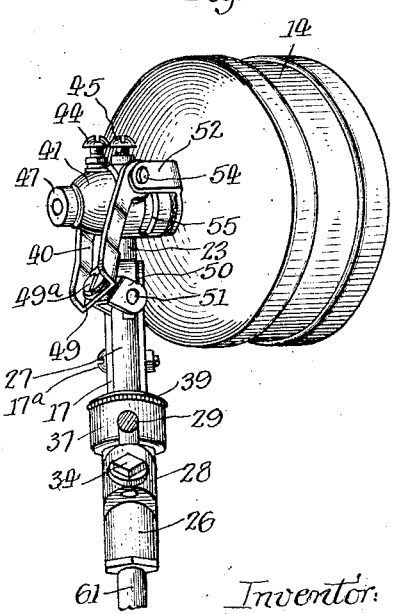
Inventor:
Lester M. Walden,
Attys.

Patented Oct. 16, 1928.

1,688,214

UNITED STATES PATENT OFFICE.

LESTER M. WALDEN, OF CHICAGO, ILLINOIS.

DIRIGIBLE LIGHT FOR MOTOR VEHICLES AND THE LIKE.

Application filed May 29, 1925. Serial No. 33,753.

The invention relates to a dirigible light for automobiles, motor boats and the like, and has for its aim the provision of a light mounted in an advantageous position near the forward portion of the vehicle and subject to control from a remote point such as the driver's seat, for up and down or horizontal swinging movement.

The primary object of my invention is to provide, in combination with means of an advantageous character for movably supporting a lamp at a point forwardly of the vehicle, an operating mechanism therefor extending from the lamp to the driver's seat or other convenient point and including a flexible connection permitting the bending of the mechanism in its passage from the lamp to the point of control, in order that the major portion thereof may be concealed from view as well as protected from the weather.

I am aware that numerous efforts have heretofore been made to produce a flexible operating mechanism for dirigible lamps so as to render their control from a remote point feasible. In some instances a plurality of wires, rods or cables have been provided, each for imparting a different movement to the lamp. In other instances flexible shafts have been employed consisting of a series of links pivotally connected together. In any case, such attempts have proven unsuccessful, either because of the high cost of manufacture or because play or looseness quickly develops so as to render the control ineffective.

In carrying out this object of my invention, I provide, in combination with means for supporting the lamp to turn on intersecting axes, actuating means including a member which is movable axially to swing the lamp on one axis and is rotatable to swing the lamp on its other axis, and means for imparting either axial or rotational movements to said member comprising a flexible shaft composed of a central wire core and wires closely coiled upon said core in opposite directions. The opposite ends of the flexible wires and the core are firmly fastened together so that torsional strains in opposite directions are effectually resisted by the oppositely wound coils, while the shaft is incompressible and nonextensible so that longitudinal movements are also effectually transmitted thereby. To prevent the shaft from buckling, it is enclosed within a suitable guide tube.

An important phase in the marketing of a dirigible spotlight is the provision of means for supporting the lamp and its operating mechanism, which is capable of universal application to the many different varieties of motor vehicles now in common use, and such application is rendered more difficult because of the objection on the part of car owners to the mutilation of the coach work or the weakening of any part of the vehicle. It is a further object of my invention, therefore, to produce means of an advantageous character, simple in construction, compact, neat in appearance and adapted for quick and easy application to substantially all motor vehicles now on the market.

In the accompanying drawings I have shown the preferred embodiment of my invention as applied to a motor vehicle, but it should be understood that it is contemplated that various changes in the construction and arrangement herein set forth in detail may be made by those skilled in the art without departing from the spirit and scope of the invention as expressed in the appended claims.

Figure 1 of the drawings is a fragmentary plan view of my improved dirigible light applied to a motor vehicle, the latter being shown partially in section.

Fig. 2 is a fragmentary side elevational view.

Fig. 3 is a fragmentary detail view illustrating the construction of the flexible shaft.

Figs. 4, 5 and 6 are vertical sectional views illustrating one of the supporting brackets for the operating mechanism, in several different applications.

Fig. 7 is a fragmentary sectional detail view taken in the line 7—7 of Fig. 1.

Fig. 8 is a detail view of one of the parts of said supporting bracket.

Fig. 9 is a fragmentary vertical sectional view through the actuating means for the lamp and illustrating the mounting of the same for swinging movement on different axes.

Fig. 10 is a rear view of the same.

Figs. 11 and 12 are fragmentary perspective views illustrating the operation of the actuating means.

Fig. 13 is a fragmentary detail sectional view showing a universal supporting bearing for the lamp.

In the drawings 14 designates a lamp of any suitable or preferred construction mounted upon an upright arm 15 through the medium of a universal support including a ball 16 so as to be capable of being tilted on a horizontal axis passing through the ball as well as on a vertical axis intersecting said horizontal axis. The arm 15 is composed of two similar pieces of metal stampings 17 (Figs. 2 and 13) secured upon opposite sides of a substantially rectangular block 18. The members 17 are thus spaced apart to receive the ball 16 between them at their upper ends, and they are secured together by means of bolts 17ª. In order thus to receive the ball, the members 17 are apertured as at 19 and suitable bearing plates 20 having concave depressions 21 are provided between the stampings 17. Said plates 20 are cup-shaped throughout the greater portion of their peripheries so as to enclose a suitable packing 22. In the upper portions of the plates 20 they are cut away to provide for the passage of a shank or stem 23 rigid with the ball 16, and a thin arcuate strip 24 engages said stem at its opposite ends and slides within the peripheral flanges 25 of the plates 20 so as to retain the packing 22.

The block 18 is formed integral with and extends forwardly from a bearing member 26 for a slide rod 27 operatively connected with the lamp as will be presently described. The bearing member 26 has a rearward extension 28 vertically apertured to receive the lower bent end of a rod 29 the upper end of which is secured to a pair of clamping members 30 adapted to be mounted upon the tie rod or bar 31, which in the case of practically all motor vehicles is provided to connect the headlights. The members 30 are adjustably secured upon the rod 29 by means of set screws 32 and their opposite ends are clamped together by means of a screw 33 passing through one of the members and screw-threaded into the other member. In the clamping action the members 30 tend to pivot in the openings receiving the rod 29 so as to grip the latter. The lower end of the rod entered in the rearward extension 28 of the bearing member may be secured in position by means of a set screw 34.

It will be noted that the clamping members 30 may be secured in any desired position laterally of the vehicle along the tie rod 31, and that the bearing member 26 may be readily adjusted to any desired height. In practice, the rod 29 as furnished is of ample length for the maximum range of adjustment desired, and then the upper end of the rod is cut off just above the upper clamping member and provided with a suitable cap 35 driven onto the rod, to produce a finished appearance.

The bearing member 26 (Fig. 9) is provided with a central upright bore 36 of a diameter such as to receive with a sliding fit the lower end portion of the rod 27, and at its upper end the bearing member is enlarged somewhat to provide a cup 37 to receive packing 38, and internally threaded to receive a gland nut 39. This packing box serves to prevent the escape of lubricant from the upper end of the bearing.

The actuating means whereby longitudinal and rotational movements imparted to the rod 27 shall be transmitted to the lamp to effect swinging movement thereof on horizontal and vertical axes passing through the ball 16, comprises in the preferred construction a pair of links 40 arranged one upon each side of a sleeve 41 which in the present instance encircles a tubular stem 42 rigid with the lamp, and is formed integral with the shank 23 carrying the ball 16. The stem 42 extends rearwardly from the lamp axially thereof and provides a cylindrical casing for a lamp socket 43. The sleeve 41 is rigidly secured upon the stem 42 by means of a set screw 44, and a second screw 45 extends through the sleeve and through an opening in the stem 42 for engagement with the lamp socket 43 so as to hold it adjustably in the stem 42. The rear end of the sleeve has an inturned flange 46 defining a central aperture closed by an apertured plug 47 through which the electric conductor 48 may pass to the socket 43.

The links 40 are connected at their rear ends by a cross piece 49 to the under side of which, centrally thereof, is secured by a pivot screw 49ª a U-shaped member or yoke 50, the arms of which straddle the upper end of the rod 27 and are pivoted thereto as at 51. The forward ends of said links 40 are pivotally connected with the opposite arms 52 of a second yoke 53 the intermediate portion of which is apertured so as to encircle freely the stem 42 forwardly of the sleeve 41. Pivot studs 54 are employed to connect the links 40 with the yoke arms 52, and these studs extend inwardly into arcuate grooves 55 formed in opposite sides of the sleeve 41 (Fig. 1). Preferably, a spring washer 56 is interposed between the yoke member 53 and the forward end of the sleeve 42 (Fig. 11) and a leaf spring 56ª fastened at its rear end to the cross piece 49 by the screw 49ª, extends forwardly and has its free end bearing on the underside of the sleeve 41 to take up any looseness between the lamp and its operating means.

It will be seen that the pivotal connection between the slide rod 27 and the links 40 constitutes a universal joint, and the arrangement is such that in the rotational movements of the rod the rear ends of the links 40 move from one side of the pivotal axis of the rod to the other. The links are inclined with respect to the axis of the stem 42 and the axis of the rod 27, and as the rod is twisted they tend to move toward a parallel relation to the rod as shown by comparison of Figs. 9 and 12. The result is that when the rod is twisted in one direction or the other, the links 40 are moved respectively forwardly and rearwardly and transmit lateral swinging movement to the lamp through the medium of the sleeve 41 and the yoke member 53, the studs 54 operating in this movement in the slots 41. In this operation the lamp swings in a true lateral path turning on the upright axis passing through the shank 23.

Longitudinal movements imparted to the rod 27 are transmitted through the links 40 and studs 54 to the sleeve 41 to cause the lamp to swing up and down on a horizontal axis passing through the ball 16; and in any position to which the lamp may have been swung up or down, it is also capable of being swung laterally as above described.

The rod 27 is moved longitudinally and rotationally by the operator stationed at a remote point such for example as the driver's seat of an automobile, through the medium of a button or knob 57 (Fig. 2) on an operating rod 58 connected to the rod 27 by means of a link 59, a rod 78 and a flexible shaft 60 operating in a guide tube 61. I have discovered that in the case of motor vehicles this operating mechanism may conveniently pass into the motor compartment from the exterior thereof at a point just rearwardly of the radiator $a$ and above the chassis frame $b$. In many instances the construction of the car is such that sufficient space is provided at this point between the hood cover and the chassis frame to clear the rear end of the tube 60 which, as shown in Figs. 1 and 2, passes alongside the radiator and then is bent inwardly just rearwardly thereof into the motor compartment. In some instances it may be necessary to notch the hood cover as shown at 62 (Fig. 2) for this purpose; but at this point the hood cover is concealed by the adjacent fender and the cutting of the cover is not objectionable. With the rear end of the tube thus inside the motor compartment the connection extends upwardly and rearwardly through the dash whence it may be supported from the instrument board.

As herein shown the operating rod 58 carrying the button or knob 57 is slidable in an elongated bearing member 63 having a spherical bearing shoulder 64 engaging in a spherical depression 65 in a plate 66 secured at its upper end to the instrument board 67. A forward extension 68 of the member 63 projects through an opening in the depression 65 and is threaded to receive a lock nut 68ᵃ and a wing nut 69. Said portion 68 is tapered and split as at 70 and the nut 69 correspondingly proportioned so that when the latter is tightened it causes the split portion 68 to clamp the rod 58 and hold it securely against movement.

The link 59 is connected at its rear end to the forward end of the operating rod 58 through the medium of a coiled spring-like device 71 having axial end portions 72 which may be connected to the rod 58 and link 59 respectively by means of suitable couplings 73 and 74. Similarly the forward end of the link 59 is connected by means of a coiled resilient device 75 and couplings 76 and 77 with the rod 78 rigid with the flexible shaft 60 and projecting from the rear end of the tube 61.

Referring now to Figs. 3 and 9, the flexible shaft 60 connecting the rods 27 and 78 comprises a central core 79 which in the present instance is made up of a plurality of relatively small parallel wires. Closely coiled upon this core 79 are a plurality of wires, four groups or sets being herein shown at 80, 81, 82 and 83. These sets are in turn composed of a plurality of wires, and the alternate sets are wound in opposite directions. At their opposite ends the wires 80, 81, 82 and 83 are soldered or otherwise rigidly secured together and within axial bores or sockets provided respectively in the rod 27 and the rod 78. The shaft as thus constructed is made of a diameter slightly less than the internal diameter of the guide tube 61 so as to be freely slidable therein, and this tube has its forward upper end entered into the lower end of the bearing 26 coaxially of the bore 36 therein. The tube may be threaded externally and the bearing internally threaded for this purpose, and a lock nut 84 provided to hold the parts rigidly together. The rear end of the tube 61 has a gland nut 85 containing suitable packing around the rod 78 to prevent the escape of lubricant from the tube.

The counterwound shaft 60 is capable of effectually transmitting twisting and longitudinal movements from the operating rod 58 to the rod 27 associated with the actuating means of the lamp. The several wires of the shaft being rigidly secured together at their opposite ends and the coiled wires being closely wound, the shaft is incompressible and nonextensible. Also, the wires being counterwound, effectually resist torsional strains in opposite directions. In the longitudinal movements of the shaft the guide tube 61 prevents the shaft from buckling.

The point of entry of the rear end of the tube 61 into the motor compartment being just above the chassis frame, is advantageous in that the latter provides a convenient support for the tube. For this purpose I provide a bracket consisting of a clamp 86 (Figs. 1, 4, 5 and 6), a pair of rods 87 and 88, a second clamp 89 and a connection 90 between the rods 87 and 88. The clamp 86 provides a bearing 91 to receive the rod 87, the latter being secured in position by means of a set screw 92. A pair of spaced jaws 93 are adapted to receive one of the horizontal flanges of the chassis frame member, or other suitable part of the framework of the car, one of the jaws being provided with suitable set screws 94 to secure the clamp in position upon the frame member. The bearing 91 has two perpendicularly disposed openings or bearing apertures 95 and 96 (Fig. 8) to receive the rod 87 so that the latter may be arranged vertically as shown in Figs. 4 and 6, or may be arranged horizontally as shown in Fig. 5.

The connection 90 between the rods 87 and 88 is in the form of a member having two perpendicularly disposed holes 97 and 98 for receiving either of the rods, suitable set screws 99 and 100 being provided to secure the rods in the desired position of adjustment.

The second clamp 89 (Figs. 1 and 7) comprises a pair of sheet metal clamping members 101 and 102 connected by means of a bolt 103 and adapted to engage and grip the rear end of the tube 60. One of said members, 102, is extended beyond the other and adjustably secured by means of a bolt 104 on the forward end of the rod 88 which is flattened as shown at 105 for this purpose.

In Figs. 1 and 4 I have shown the supporting means for the tube as it is applied in the majority of cases to motor vehicles, it being in this instance secured to the upper flange of the side chassis frame member. The rod 87 extends upwardly from the clamp and carries the connection 90 from which extends forwardly the rod 88 carrying the tube clamp 89. It will be seen that by this arrangement the tube clamp may be adjusted laterally as well as vertically.

In the case shown in Fig. 5 the rod 87 is arranged horizontally so as to clear a flange above the chassis frame. In the case shown in Fig. 6 the clamp 86 is secured to a cross member of the frame instead of to a side member.

It will be seen that I have provided means of a simple and effectual character for supporting a dirigible lamp in an advantageous position forwardly of the vehicle, and operating means of a character such that the lamp may be readily controlled from a remote point such as the driver's seat. The control is effected by a single operating member, and the longitudinal and rotational movements imparted to said member are effectually transmitted to the lamp by a means permitting the operative connections to be concealed substantially from view as well as protected from the weather, while the parts which are exposed are compact and neat in appearance, and are so supported as not to injure the coach work of the vehicle or other parts thereof.

I claim as my invention:

1. The combination with a motor vehicle having a chassis frame and a radiator at the forward end of the frame; of a lamp, means for supporting the lamp for up and down and lateral motion at a point forwardly of the radiator a substantial distance above the chassis frame, a bent tube having an uprightly disposed upper end portion fastened to said lamp-supporting means, means for supporting the lower rear end of said tube adjacent the chassis frame with the tube bent inwardly at a point immediately rearward of the radiator, and operating means for the lamp including a flexible shaft enclosed within said tube.

2. The combination with a motor vehicle having a chassis frame and a radiator at the forward end of the frame; of a lamp, means for supporting the lamp for up and down and lateral motion at a point forwardly of the radiator and above the chassis frame, a bent tube having an uprightly disposed upper end portion stationarily supported relative to said lamp-supporting means, means for supporting the lower rear end of said tube adjacent the chassis frame, and operating means for the lamp including a flexible wire shaft enclosed within said tube, said tube being bent at a point adjacent the radiator first inwardly and thence rearwardly into the motor compartment, and said operating means including a member having one end projecting into the driver's compartment of the vehicle and its other end into the motor compartment for connection with the flexible shaft.

3. The combination with a motor vehicle having a chassis frame and a radiator at the forward end thereof; of a lamp, operating mechanism for the lamp adapted to move it including a flexible shaft having a slide rod at one end operatively connected with the lamp, a bearing for said slide rod, a tube fastened to the bearing and enclosing said shaft, said bearing having means for supporting the lamp for up and down and lateral motion, means for stationarily supporting the bearing, and means for fastening the tube to the chassis frame with the tube bent inwardly immediately rearward of the radiator.

In testimony whereof, I have hereunto affixed my signature.

LESTER M. WALDEN.